United States Patent [19]
Palopoli et al.

[11] 3,890,328
[45] June 17, 1975

[54] N,N-DIOXIDES OF BIS-BASIC CYCLIC KETONES

[75] Inventors: Frank P. Palopoli; John P. Paolini, Cincinnati, Ohio

[73] Assignee: Richardson-Merrell Inc., Wilton, Conn.

[22] Filed: Mar. 8, 1974

[21] Appl. No.: 449,225

[52] U.S. Cl. ............... 260/293.62; 260/247.7 F; 260/293.58; 326.5 C; 260/335; 260/570.5 P; 424/248; 424/267; 424/274; 424/283; 424/330
[51] Int. Cl............................................ C07d 29/20
[58] Field of Search ... 260/247.7 F, 293.58, 293.62, 260/326.5 C, 335, 570.5 P

[56] References Cited
UNITED STATES PATENTS

| | | | |
|---|---|---|---|
| 3,531,489 | 9/1970 | Albrecht et al. | 260/294.3 |
| 3,576,865 | 4/1971 | Fleming et al. | 260/559 |
| 3,592,819 | 7/1971 | Fleming et al. | 260/294.7 C |
| 3,647,860 | 3/1972 | Sill et al. | 260/475 FR |
| 3,707,471 | 12/1972 | Albrecht et al. | 260/293.62 |

OTHER PUBLICATIONS

Cram et al., "Organic Chemistry," 2nd Ed., McGraw–Hill, New York, (1964), pp. 551–552.
migrdichian, "Organic Synthesis," Vol. 1, Reinhold, New York, (1957), p. 491.

*Primary Examiner*—G. Thomas Todd
*Attorney, Agent, or Firm*—Wm. J. Stein; Eugene O. Retter; George W. Rauchfuss, Jr.

[57] ABSTRACT

Novel N,N-dioxide derivatives of bis-basic cyclic ketones, their preparation and use for the prevention and inhibition of virus infections.

7 Claims, No Drawings

N,N-DIOXIDES OF BIS-BASIC CYCLIC KETONES

SUMMARY OF THE INVENTION

This invention relates to new derivatives of bis-basic ketones, to their method of preparation, compositions thereof and to their usefulness as pharmaceutical agents. More particularly, the compounds of the present invention are N,N-dioxide derivatives of certain cyclic bis-basic ketones which are useful antiviral agents. Still more particularly, the compounds of the present invention are represented by the following formula:

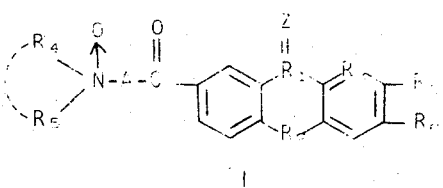

wherein Z is oxygen or $H_2$; $R_1$ is carbon; $R_2$ is a sigma bond or oxygen; $R_3$ is methylidyne; A is a straight or branched alkylene chain having from 2 to 4 carbon atoms; $R_4$ and $R_5$ are each selected from the group consisting of lower alkyl having from 1 to 3 carbon atoms and when taken together with the nitrogen atom to which they are attached represent the pyrrolidinyl, piperidino and morpholino group; $R_6$ is selected from the group consisting of hydrogen and

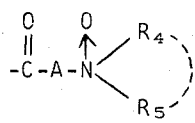

with the proviso that one and only one such $R_6$ group is hydrogen; $R_1$, Z and $R_3$ taken together form the group

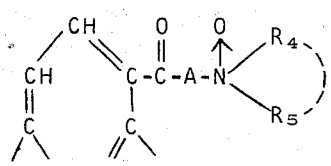

when each $R_6$ is hydrogen and $R_2$ is a sigma bond; and the pharmaceutically acceptable acid addition salts thereof.

In general the N,N-dioxide derivatives herein described are prepared by reacting a bis-basic cyclic ketone with hydrogen peroxide or a peracid selected from the group consisting of peracetic, perbenzoic, monoperphthalic and m-chloroperbenzoic acids. This reaction can be schematically represented as follows:

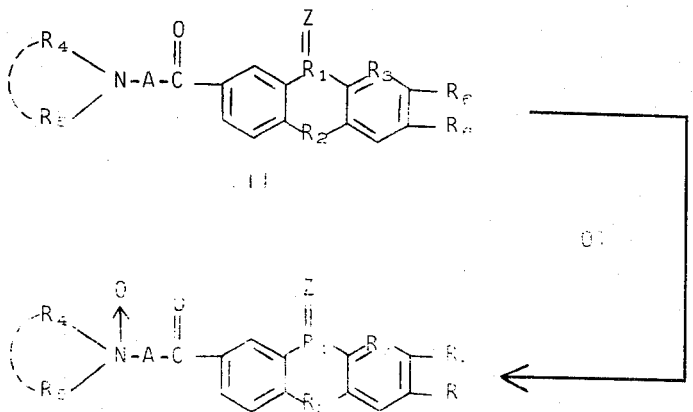

In the above reaction sequence the symbols Z, $R_1$, $R_2$, $R_3$, A, $R_4$, $R_5$ and $R_6$ have the values previously assigned.

In order to achieve an antiviral effect the novel compounds of this invention are administered to a suitable host using a variety of compositions. Such compositions may be administered either prior to infection as a prophylactic use or treatment, or they may be therapeutically administered subsequent to infection as a curative use or treatment. The compounds of this invention can be applied externally or topically directly at the situs of infection, or they may be administered internally or systemically irrespective of whether the treatment is prophylactic or curative in nature. In either event replication of the infectious virus is inhibited or prevented with the concomitant effect that the disease symptoms characteristic of the pathogenic virus infection are no longer present.

BACKGROUND OF THE INVENTION

There is a growing body of information that viruses play a vital role in a broad range of diseases, some of which represent the most serious of man's ills. Arthritis, juvenile arthritis, diabetes, Hodgkin's disease, and various immunological diseases and degenerative diseases of the central nervous system have been linked with viruses as the causative agents.

At present, the control of virus infections is primarily achieved by means of immunization vaccines. For example, poliomyelitis, smallpox, measles and influenza are well recognized diseases in which viral vaccines have proven effective. In general, however, viral vaccines have had only a moderate success in animal prophylaxis. Each vaccine acts primarily against a specific virus and is not heterophilic in the protection it offers. Hence, vaccines have not provided a practical solution against the wide array of infectious viruses, even where limited, as for example, to respiratory viruses alone.

One approach to the control of virus-related diseases, particularly to the spread of such virus diseases, has been to search for medicinal agents or chemotherapeutic agents which are capable of inhibiting the growth of viruses, thereby preventing the spread of disease and preventing further damage to cells and tissues of the animal host which have not as yet been infected. Heretofore, only a limited number of virus infections such as smallpox, Asian influenza, and herpes keratitis have been prevented by chemical antiviral agents. Sulfonamides and antibiotics, which have revolutionized the treatment of bacterial infections, have substantially no effect upon virus infections. A limited number of infections caused by large viruses, such as lymphogranuloma venereum, psittacosis and trachoma have been successfully treated using antibiotics and sulfa drugs. However, the majority of virus infections have not been responsive to attack by chemotherapeutic agents.

The bis-basic ketones of certain cyclic nuclei have now been recognized to be useful antiviral agents for the treatment of viral infections in animals and man. Such compounds, however, show adverse side effects in animals which become more apparent with increasing dosages. Various structural modifications and derivatives of these bis-basic ketones have been attempted which would still possess the potent antiviral activity of the parent compounds without retaining these undesirable side effects.

As a result of a long series of investigations, applicants have discovered that mild oxidation of certain bibasic cyclic ketones results in the formation of a class of N,N-dioxide derivatives which, surprisingly, retains, and in some instances actually surpasses, the excellent activity of the parent compounds. These N,N-dioxide derivatives are effective against a wide spectrum of virus infections and are useful in treating such infections both prophylactically and therapeutically.

The closest art known to applicants discloses the starting materials for the preparation of the compounds of the present invention. Applicants are not aware of any N,N-dioxide derivatives of bis-basic cyclic compounds which have heretofore been reported to possess antiviral activity.

DETAILED DESCRIPTION OF THE INVENTION

As can be seen from general formula (I) and its description above, the compounds of the present invention include the N,N-dioxide derivatives of fluorene, xanthene or fluoranthene bis-basic ketones. Nevertheless, all of the compounds of the present invention share a community of common characteristics, both chemically and biologically. Chemically speaking all of the compounds have common bis-basic ketone side chains. Each side chain can be regarded as consisting essentially of a ketone bridging function located on the benzenoid portions of an aromatic cyclic nucleus, a basic tertiary amino group located at the terminal end of said side chain, and a two to four carbon alkylene chain, either branched or unbranched, which separates the bridging function from the terminal basic function. Additionally, all of the compounds of this invention are N,N-dioxide derivatives of the bis-basic amine function prepared in the same manner. Biologically speaking, all of the compounds are antiviral agents.

When $R_2$ is a sigma bond, the N,N-dioxides of 2,6- or 2,7-bis-basic ketones of fluorene and 2,6- or 2,7-bis-basic ketones of fluoren-9-one are delineated. The expression "sigma bond" refers to the ordinary single bond linkage between two adjacent carbon atoms resulting from the overlap of their corresponding orbitals. These compounds represent a preferred subgenus which can be represented by the following structure wherein the symbols Z, A, $R_4$, $R_5$ and $R_6$ have the values previously assigned.

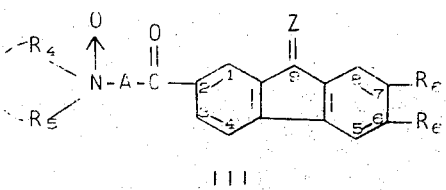

(III)

Illustrative of the N-oxide derivatives of the bis-basic fluorene ketone type base compounds, represented by general formula (III) above, there can be mentioned: 2,6-bis[2-(dimethylamino)propionyl]fluorene N,N-dioxide, 2,6-bis-[3-(piperidino)propionyl]fluoren-9-one N,N-dioxide, 2,6-bis[3-(diisopropylamino)-butyryl]fluoren-9-one N,N-dioxide, 2,6-bis[3-(diethylamino)propionyl]fluorene N,N-dioxide, 2,7-bis[2-(pyrrolidinyl)valeryl]fluorene N,N-dioxide, 2,7-bis[4-(dipropylamino)butyryl]fluoren-9-one N,N-dioxide, 2,7-bis[3-(morpholino)propionyl]fluoren-90-one N,N-dioxide, and 2,7-bis[5-(diethylamino)-valeryl]fluorene N,N-dioxide.

When the symbol $R_2$ is oxygen, the N,N-dioxides of 3,6- or 3,7-bis-basic ketones of xanthene and 3,6- or 3,7-bis-basic ketones of xanthen-9-one are delineated. These compounds can be represented by the following structure wherein the symbols Z, A, $R_4$, $R_5$ and $R_6$ have the values previously assigned.

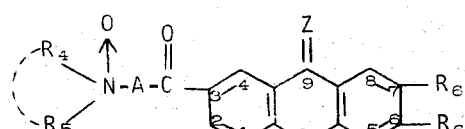

(IV)

Illustrative of the N,N-dioxide derivatives of the bis-basic xanthene ketone type base compounds, represented by general formula (IV) above, there can be mentioned: 3,6-bis[2-(diisopropylamino)butyryl]xanthene N,N-dioxide, 3,6-bis[3-(morpholino)propionyl]xanthen-9-one N,N-dioxide, 3,6-bis-[4-(dimethylamino)butyryl]xanthen-9-one N,N-dioxide, 3,6-bis[3-(pyrrolidinyl)propionyl]xanthene N,N-dioxide, 3,7-bis[5-(diethylamino)valeryl]xanthene N,N-dioxide, 3,7-bis-[4-(piperidino)butyryl]xanthene N,N-dioxide, 3,7-bis[3-(morpholino)propionyl]xanthen-9-one N,N-dioxide, and 3,7-bis[3-(dipropylamino)valeryl]xanthen-9-one N,N-dioxide.

The N,N-dioxides of 3,9-bis-basic ketones of fluoranthene are also within the scope of the present invention. The compounds are defined when the symbols $R_1$, Z and $R_3$ are taken together to form the group

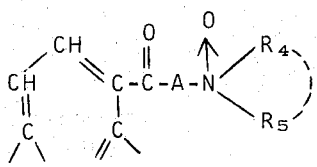

when each of the $R_6$ groups are hydrogen and $R_2$ is a sigma bond. The 3,9-bis-basic ketones of fluoranthene can be structurally depicted as follows wherein the symbols A, $R_4$ and $R_5$ have the values previously assigned.

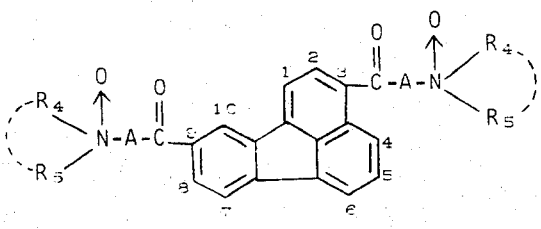

Illustrative of the N,N-dioxide derivatives of the 3,9-bis-basic ketones of fluoranthene type base compounds represented by the formula (V) above, there can be mentioned: 3,9-bis[2-(diethylamino)propionyl]fluoranthene N,N-dioxide, 3,9-bis[4-(piperidino)butyryl]fluoranthene N,N-dioxide, 3,9-bis[5-(diisopropylamino)valeryl]fluoranthene N,N-dioxide, 3,9-bis[3-(morpholino)butyryl]fluoranthene N,N-dioxide, 3,9-bis[3-(dimethylamino)valeryl]fluoranthene N,N-dioxide, 3,9-bis[3-(diethylamino)propionyl]fluoranthene N,N-dioxide, 3,9-bis[4-(pyrrolidinyl)butyryl]fluoranthene N,N-dioxide and 3,9-bis[3-(piperidino)propionyl]fluoranthene N,N-dioxide.

The alkylene chain, represented by the symbol A, which separates the ketone bridging group from the terminal bis-basic amine consists of either a 2, 3 or 4-membered straight or branched alkylene chain. These radicals may more properly be designated, for example, as 1,2- 1,3- and 1,4-alkanediyl radicals according to the present rules of Chemical Abstract nomenclature. However, these groups have been termed as alkylene radicals throughout the instant application in accordance with the more generally recognized and understood former system of nomenclature. Illustrative of such alkylene chains represented by the symbol A are ethylene, trimethylene, butylene, isopropylene and isobutylene. When the symbol A represents the trimethylene radical, a preferred subgenus is formed.

The basic amino group located at the terminal end of each side chain must be a tertiary amine. In general this portion of the molecule can be represented by the radical

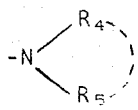

in which the symbols $R_4$ and $R_5$ represent a lower alkyl group having from 1 to 3 carbon atoms. The term lower alkyl refers to simple aliphatic carbon side chains. Illustrative of such groups are the methyl, ethyl, propyl and isopropyl radicals. Where $R_4$ and $R_5$ each represent lower alkyl, a preferred subgenus is formed.

The symbols $R_4$ and $R_5$ may also represent various saturated, monocyclic, heterocyclic radicals when taken in conjunction with the amine nitrogen atom to which they are attached. Typical of such heterocyclic groups are the pyrrolidinyl, piperidino and morpholino radicals. Compounds containing such groups are readily prepared and typify saturated, monocyclic, heterocyclic radicals which are generally useful in lieu of the dilower alkylamino groups present in the compounds of this invention.

The symbols $R_6$ refer to the bis-portion of the basic ketone side chain in the fluorene and xanthene nucleus. It should be noted that there can be one and only one such radical present, i.e., one of the $R_6$ groups must always be hydrogen. The tris-basic ketones are not within the scope of the present invention. Nevertheless, the bis-basic ketone side chains may be in one of two isomeric positions in the case of the fluorene or xanthene nucleus. Thus in the fluorene series the basic ketone side chains are located in either the 2,6- or the 2,7-positions. In the xanthene series these side chains are located in either the 3,6- or the 3,7-positions due to the difference in numbering systems.

The expression "pharmaceutically acceptable acid addition salts" refers to any organic or inorganic acid addition salts of the base compounds of formula (I) which are non-toxic in nature. In general these salts are crystalline materials which, in comparison to their free base forms, demonstrate higher melting points and exhibit an increased stability. Illustrative inorganic acids which form suitable salts include hydrochloric, hydrobromic, sulfuric and phosphoric acids and acid metal salts such as sodium monohydrogen orthophosphate and potassium hydrogen sulfate. Illustrative organic acids which form suitable salts are the mono, di and tri-carboxylic acids, as for example, acetic, propionic, glycolic, lactic, pyruvic, malonic, succinic, glutaric, fumaric, malic, tartaric, citric, maleic, ethoxymaleic, benzoic, p-hydroxybenzoic, phenylacetic, cinnamic, salicylic, 2-phenoxybenzoic, or the sulfonic acids such as methanesulfonic acid and 2-hydroxyethanesulfonic acid. Either the mono or the di-acid salts may be formed.

The N,N-dioxides of the present invention readily form hydrates in varying degrees depending upon the amount of water present and their method of isolation. Although not technically a salt in nature, these hydrates are also contemplated to be within the scope of the expression "pharmaceutically acceptable acid addition salts" as used herein.

The starting materials for the preparation of the N,N-dioxides of the present invention are all found described in the prior art. Co-pending application Ser. No. 328,912, filed Feb. 2, 1973, whose counterpart has been published as Belgian Pat. No. 764,870, discloses the preparation of the bis-basic ketones of fluorene and fluoren-9-one used as starting materials. Co-pending application Ser. No. 97,379, filed Dec. 11, 1970, whose counterpart has been published as Belgian Pat. No. 776,535, discloses the preparation of the bis-basic ketones of xanthene and xanthen-9-one used as starting materials. Co-pending application Ser. No. 308,806, filed Nov. 22, 1972, whose counterpart has been published as Belgian Pat. No. 766,284, discloses the preparation of the bis-basic ketones of fluoranthene used as starting materials.

The novel N,N-dioxides of the present invention are prepared by the mild oxidation, in solution, of a bis-(tertiary)basic ketone of fluorene, xanthene or fluoranthene as illustrated by general formula (II) above with its reaction sequence. In general, bis-basic amines are more resistant to oxidation in acid solutions by virtue of the stabilizing effect of their salt formation. However, the bis-basic tertiary amines can be oxidized in both alkaline as well as acid solutions by means of suitable oxidizing agents to form the corresponding amine oxides (i.e., N,N-dioxides). Suitable oxidizing agents include hydrogen peroxide and various peracids such as peracetic, perbenzoic, monoperphthalic and m-chloroperbenzoic acids. Additionally, the oxidation of the bis-basic ketones can be conducted in the presence of calcium hypochlorite in a dioxane/water solvent system or with organic hydroperoxides, such as tertiary butylhydroperoxide using a benzene solvent in the presence of a heavy metal catalyst such as vanadium pentoxide. The reaction with peracetic acid or m-chloroperbenzoic acid is particularly useful since the reaction proceeds smoothly and can be readily controlled.

The oxidation reaction is generally carried out in a suitable solvent such as water, methanol or ethanol in the case of a peroxide oxidation. Additionally, when hydrogen peroxide is utilized as the oxidizing agent the reaction solution is rendered slightly alkaline using a dilute solution of ammonia or sodium bicarbonate. In the case of a peracid type oxidation, acetic acid is the preferred solvent for peracetic acid. In the case of m-chloroperbenzoic acid the preferred solvents are chloroform and methylene dichloride. Because of the high solubility of the N,N-dioxides in water, the latter solvents are also preferred to facilitate in the recovery of the product.

The temperature at which the reaction takes place is not deemed critical. Very low temperatures are preferably avoided inasmuch as the reaction proceeds extremely slowly. On the other hand, very high temperatures are to be avoided due to the hazards created in working with peracids. Generally a temperature ranging from about room temperature to about 50°C. is utilized. The reaction period ranges from about 1 hour to about 3 days, depending, of course, upon the temperature at which the reaction is conducted. Preferably, as a matter of convenience, the peracid oxidations are conducted overnight at room temperature.

The N,N-dioxides of the present invention are isolated by well known methods known to the art such as extraction, antisolvent precipitation, chromatography, etc. The N,N-dioxides readily combine with water to form ammonium bases. These bases can be regarded as quaternary ammonium hydroxixes due to the polar nature of the fifth valence of the nitrogen atoms. This polar nature of the nitrogen atom undoubtedly accounts for the unusual solubility characteristics of these compounds. Whereas the bis-basic tricyclic ketones are, in general, insoluble in polar solvents as their free bases, the corresponding N,N-dioxides are extremely soluble in polar solvents. Due to their high water solubility, silica gel partition chromatography is particularly useful in isolating small quantities of pure material.

Various degrees of oxidation are possible resulting in both mono-N-oxide formation and di-N-oxide formation, with various intermediate mixtures also being obtained. As the degree of oxidation increases, more and more of the di-N-oxides are formed. The oxidation reaction can be monitored by means of thin layer chromatography, using techniques known to those skilled in the art. The oxidation reaction is limited only by the stability of the starting material to oxidative degradation and is generally run for a sufficient period of time to insure complete conversion to the N,N-dioxides.

The compounds of the present invention are potent antiviral agents. Preferably they are administered to an animal host to prevent or inhibit viral infections. The term host refers to any viable biological material or intact animal including humans which serves as a support means for virus replication. The host can be of animal or mammalian origin. Illustratively such hosts include: birds, mice, rats, guinea pigs, gerbils, ferrets, dogs, cats, cows, horses and humans. Other viable biological materials, such as that used in the production of vaccines, may also act as a host. Thus, tissue cultures prepared from organ tissues, such as mammalian kidney or lung tissue, as well as tissue cultures prepared from embryo tissue, such as obtained from amniotic cells and chick allantoic fluid, have been found to be useful hosts.

The treatment of virus infections for purposes of the present invention encompasses both the prevention and the inhibition of characteristic disease symptoms in a mammalian host susceptible to invasion by a pathogenic virus. Illustrative of mammalian virus infections which can be prevented or inhibited by the administration of the compounds of the present invention are infections caused by picornaviruses, such as encephalomyocarditis virus; myxoviruses, such as the influenza $A_2$ (Jap/305) virus; arboviruses, such as Semliki forest virus; the herpes group of viruses, including herpes simplex; and the poxviruses, as for example, vaccinia IHD. Thus, for example, the compounds of the present invention when administered orally or subcutaneously to mice in varying doses either shortly prior or subsequent to a fatal inoculation of a neurotropic virus such as encephalomyocarditis virus, having a $LD_{50}$ of from 5 to 50, delay or prevent completely the onset of death. Salts of these compounds of the present invention are generally administered in compositions containing a 0.15% aqueous hydroxyethylcellulose vehicle, whereas the free base compounds are generally administered in compositions containing a 10% aqueous surfactant vehicle in order to help solubilize the compound. In general, ten mice are used in each treated group with an additional 20 mice serving as a control group. At the time of administration the test virus is titrated in order to determine the potency or $LD_{50}$ for the particular virus pool used as a challenge. The control animals are given a placebo containing the identical volume of vehicle without, of course, the active ingredient. Because of the lethal nature of the test system employed, the antiviral nature of the test compound is dramatically illustrated with a side by side comparison of the treated surviving animals and the untreated control group of animals.

Respiratory viruses, such as influenza $A_2$ (Jap/305) virus, which are also lethal to the test animals employed, are administered via intranasal instillation. Animals infected in this manner have the active ingredients, administered in the same manner as the test virus, and again a side by side comparison is made of the survivors of the animals treated with the untreated control animals.

Inexplicably, a mouse fatally infected with encephalomyocarditis or influenza virus occasionally survives without further treatment. This may be the result of a prior, interferon-induced infection in the mouse, or perhaps due to some genetic factor or other natural defense mechanism not presently understood. For this reason the control group selected is of sufficient size so as to statistically reduce to a negligible amount the influence of such a chance survivor upon the test results.

The vaccinia test virus is typical of the dermatotrophic type viruses which respond to treatment with compositions containing the compounds of the instant invention. The vaccinia virus generally produces a non-fatal infection in mice, producing characteristic tail lesions when the virus is subcutaneously administered to the tail of the mouse. The instant compounds are administered either orally or subcutaneously either prior to or subsequent to the vaccinia infection. Tail lesions are subjectively scored on the eighth day following infection against untreated animals, which serve as a control group. The compounds of the present invention have been found to be effective in varying degrees against one or all of these test viruses.

The mode of activity of the active ingredients of the present invention is not rigorously defined. Inter alia, the compounds of the present invention may induce the formation of interferon in a viable host. Interferon is a biological substance of unknown chemical structure, presumably proteinaceous in nature, which is produced by host cells in response to a viral infection. The interferon so produced acts on cells to induce the formation of a virus inhibiting substance, which inhibits in some yet unknown manner the intracellular replication of the virus without appearing to have any inactivation effect per se upon the virus. A few of the viruses suceptible to interferon replication inhibition are described in Horsfall and Tamm, "Viral and Rickettsial Infections of Man," 4th Edition (1965), J. B. Lippincott Company, pp. 328-9.

As earlier indicated, the compounds of the present invention may be prophylactically administered in order to prevent the spread of contagious viral diseases, or they may be therapeutically administered to a host already infected intended for their curative effect. When administered prophylactically, it is preferred that the administration be made within 0 to 96 hours prior to the infection of the host animal with a pathogenic virus. When the compounds of the present invention are administered for their curative effect, it is preferred that they be administered within about 1 or 2 days following infection of the host in order to obtain the maximum therapeutic effect.

The dosage administered will be dependent upon such parameters as the particular virus for which either treatment or phrophylaxis is desired, the species of animal involved, its age, health, weight, the extent of infection, concurrent treatment, if any, frequency of treatment and the nature of the effect desired. A daily dose of the active ingredients will generally range from about 0.1 mg to about 500 mg per kg of body weight. Illustratively, dosage levels of the administered active ingredients for intravenous treatment range from about 0.1 mg to about 10 mg per kg of body weight; for intraperitoneal administration range from about 0.1 mg to about 50 mg per kg of body weight; for subcutaneous administration range from about 0.1 mg to about 250 mg per kg of body weight; for oral administration range from about 0.1 mg to about 500 mg per kg of body weight; for intranasal instillation range from about 0.1 mg to about 10 mg per kg of body weight; and for aerosol inhalation therapy, the range is generally from about 0.1 mg to about 10 mg per kg of body weight.

Additionally the compounds of this invention are useful in suppressing responses of delayed hypersensitivity. Such responses frequently arise in response to infectious diseases, such as tuberculosis, streptococcal and staphylococcal infections, typhoid fever and undulant fever; in response to the administration of toxoids and vaccines, particularly diphtheria toxoid and smallpox vaccination; contact skin hypersensitivity; tissue grafts and transplants; and autoimmune diseases such as rheumatoid arthritis, rheumatic fever, Addison's disease and Graves' disease.

The novel compounds described herein can also be administered in various different dosage unit forms, i.e., oral compositions such as tablets, capsules, dragees, lozenges, elixirs, emulsions, clear liquid solutions and suspensions; parenteral compositions such as intramuscular, intravenous or intradermal preparations; and topical compositions, such as lotions, creams or ointments. The amount of active ingredient contained in each dosage unit form will, of course, vary widely according to the particular dosage unit employed, the animal host being treated, and the nature of the treatment, i.e., whether prophylactic or therapeutic in nature. Thus, a particular dosage unit may contain from about 2.0 mg to over 3.0 g of active ingredient in addition to the pharmaceutical excipients contained therein.

The novel compounds described herein can be employed in conjunction or admixture with additional organic or inorganic pharmaceutical excipients. Suitable solid excipients include gelatin, lactose, starches, magnesium stearate and petrolatum. Suitable liquid excipients include water and alcohols such as ethanol, benzyl alcohol and polyethylene alcohols either with or without the addition of a surfactant. In general, the preferred liquid excipients particularly for injectable preparations, include water, saline solution, dextrose and glycol solutions, such as aqueous propylene glycol or an aqueous solution of polyethylene glycol. Liquid preparations to be used as sterile injectable solutions will ordinarily contain from about 0.5 to about 25%, weight, and preferably from about 1 to about 10% by weight, of the active ingredient in solution. In certain topical and parenteral preparations, various oils are utilized as carriers or excipients. Illustrative of such oils are mineral oils, glyceride oils such as lard oil, cod liver oil, peanut oil, sesame oil, corn oil and soybean oil.

A preferred method of administration for the compounds of the present invention is orally either in a solid dosage form such as a tablet or capsule, or in a liquid form such as an oral elixir, suspension, emulsion or syrup. Ordinarily, the active ingredient comprises from about 0.5% to about 10% by weight in an oral liquid composition. In such compositions, the pharmaceutical carrier is generally aqueous in nature, as for example, aromatic water, sugarbased syrup or a pharmaceutical mucilage. For insoluble compounds, suspending agents may be added as well as agents to control viscosity, as for example, magnesium aluminum silicate or carboxymethylcellulose. Buffers, preservatives, emulsifying agents and other excipients can also be added.

For parenteral administration such as intramuscular, intravenous or subcutaneous administration, the proportion of active ingredient ranges from about 0.05 to about 20% by weight, and preferably from about 0.1 to about 10% by weight of the liquid composition. In order to minimize or eliminate irritation at the site of injection, such compositions may contain a non-ionic surfactant having a hydrophile-lipophile balance (HLB) of about 12 to about 17. The quantity of surfactant in such formulations ranges from about 5 to about 15% by weight. The surfactant can be a single surfactant having the above-identified HLB, or a mixture of two or more components having the desired HLB. Illustrative of surfactants useful in parenteral formulations are the class of polyoxyethylene sorbitan fatty acid esters, as for example, sorbitan monooleate and the high molecular weight adducts of ethylene oxide with a hydrophobic base, formed by the condensation of propylene oxide with propylene glycol. The concentration of active ingredient contained in these various parenteral dosage unit forms varies over a broad range and comprises anywhere from about 0.05% to about 20% by weight of the total formulation, the remaining component or components consisting of liquid pharmaceutical excipients previously mentioned.

The active ingredients of the present invention can also be admixed directly with animal feeds or incorporated into the drinking water of animals. For most purposes, an amount of active ingredient is used which provides from about 0.0001 to about 0.1% and preferably, from about 0.001 to about 0.02% by weight of the active ingredient based upon the total weight of feed intake. The active ingredients can be admixed in animal feed concentrates suitable for use by farmers or livestock growers for incorporation in appropriate amounts with the final animal feeds. These concentrates ordinarily comprise from about 0.5 to about 95% by weight of the active ingredient compounded with a finely divided solid carrier or flour, such as wheat, corn, soybean or cottonseed flour. Depending upon the particular animal to be fed, nutrients and fillers may also be added such as ground cereal, charcoal, fuller's earth, oyster shells and finely divided attapulgite or bentonite.

The active ingredients of the present invention can be packaged in a suitable pressurized container together with an aqueous or volatile propellant for use as an aerosol. A suitable discharge valve is fitted to an opening in the container from which the active ingredients may be conveniently dispensed in the form of a spray, liquid, ointment or foam. Additional adjuvants such as co-solvents, wetting agents and bactericides may be employed as necessary. Normally, the propellant used is a liquified gaseous compound, preferably a mixture of low molecular weight fluorinated hydrocarbons. These haloalkanes are preferred because of their compatability with the active ingredients of the present invention, and because they are non-irritating when applied to skin surfaces. Other useful propellants include ethylene oxide, carbon dioxide, propane and nitrogen gas.

The invention described herein is more particularly illustrated by means of the following specific examples.

EXAMPLE 1

3,9-Bis[4-(piperidino)butyryl]fluoranthene

A solution of 11.3 g (0.03 mole) of 3,9-bis(4-chlorobutyryl)fluoranthene, 20.4 g (0.24 mole) of piperidine, 10.0 g (0.06 mole) potassium iodide and 200 ml of butanone is stirred and heated at its reflux temperature for 3 days and poured into 1000 ml of water. The resulting precipitate is filtered and recrystallized three times from chloroform-acetone to yield 3,9-bis[4-(piperidino)butyryl]fluoranthene having a m.p. of 126.0°–8.5°C. Recrystallization from an aqueous hydrochloric acid-acetone solution results in the formation of the dihydrochloride salt.

In a similar fashion 8.0 g (0.02 mole) of 3,9-bis-(3-chloropropionyl)fluoranthene, 50 ml of piperidine, 50 ml of chloroform and 200 ml of p-dioxane are refluxed for 15 minutes with stirring and filtered. The filtrate is washed with water and the organic layer combined with ether, washed with water and aqueous hydrochloric acid. The resulting precipitate is filtered and recrystalized from water-acetone to yield 3,9-bis[3(piperidino)propionyl]fluoranthene as the dihydrochloride salt having a m.p. of 206°–210°C.

In another preparation 18.0 g (0.041 mole) of 3,9-bis(5-chlorovaleryl)fluoranthene, 175 ml of diethylamine, 10 g of potassium iodide and 75 ml of tetrahydrofuran are placed in a Paar bomb and heated at 130°C. for 25 hours. The reaction mixture is filtered, the filtrate evaporated to dryness and the residue recrystalized three times from ether to yield the desired 3,9-bis[5-(diethylamino)valeryl]fluoranthene having a m.p. of 84.5–5.0°C.

EXAMPLE 2

3,9-Bis[4-(piperidino)butyryl]fluoranthene N,N-dioxide

A mixture of 13 g of 3,9-bis[4-(piperidino)butyryl]fluoranthene, 10.5 g of an 85% m-chloroperbenzoic acid solution and 450 ml of chloroform are stirred at room temperature for a period of 1 hour. The solvent is removed in vacuo and the residue dissolved in 200 ml of methanol. The resulting solution is percolated through a 7 × 10 cm anion exchange chromatographic column (Dowex 2—OH − form). The column is washed with methanol until the effluent appears colorless. The combined effluents are evaporated to dryness and the residue triturated with acetone to form a yellow solid. The solid is filtered and recrystallized twice from a chloroform/acetone solution to yield 3,9-bis[4-(piperidino)butyryl]fluoranthene N,N-dioxide as a hydrated yellow solid having a m.p. of 103°–5°C.

Following essentially the same procedure but substituting 3,9-bis[3-(piperidino)propionyl]fluoranthene and 3,9-bis[5-(diethylamino)valeryl]fluoranthene for the 3,9-bis[4-(piperidino)butyryl]fluoranthene above, results in the formation of 3,9-bis[3-(piperidino)propionyl]fluoranthene N,N-dioxide and 3,9-bis[5-bis[5-(diethylamino)valeryl]fluoranthene N,N-dioxide respectively.

EXAMPLE 3

2,7-Bis[4-(piperidino)butyryl]fluorene

A mixture of 18.8 g (0.05 mole) of 2.7-bis(4-chlorobutyryl)fluorene, 34.0 g (0.4 mole) of piperidine, 16.6 g (0.1 mole) of potassium iodide in 200 ml of butanone is stirred and refluxed for three days. The reaction mixture is poured into water, and the solid which precipitates is recrystallized twice from chloroform-acetone to yield 2,7-bis[4-(piperidino)butyryl]fluorene having a m.p. of 157°–9°C. The dihydrochloride salt is formed by dissolving the base compound in a chloroform-butanone mixture and acidifying the solution with ethereal hydrochloric acid. The salt which is further purified by recrystallization from a methanol-butanone solution has a m.p. of 286°–8°C.

Following essentially the same procedure but substituting morpholine for the piperidine above, results in the formation of 2,7-bis[4-(morpholino)butyryl]fluorene having a m.p. of 166.5°–8.5°C.

EXAMPLE 4

2,7-Bis[5-(diethylamino)valeryl]fluorene

A mixture of 30.0 g (0.074 mole) of 2,7-bis(5-chlorovaleryl)fluorene, 2.0 g of potassium iodide, 200 ml of diethylamine and 100 ml of tetrahydrofuran are stirred and heated in a Paar bomb at 120°C. for 24 hours. The reaction mixture is combined with 300 ml of water, concentrated to 100 ml and 300 ml of water additionally added. The precipitate which forms is recrystallized from ether-acetone and again from ether to yield the desired 2,7-bis[5-(diethylamino)valeryl]fluorene having a m.p. of 78°–80°C.

Using essentially the same procedure but substituting a 40% aqueous dimethylamine solution for the diethylamine above results in the formation of 2,7-bis[5-(dimethylamino)valeryl]fluorene having a m.p. of 124°–6°C.

The corresponding derivatives of fluoren-9-one are prepared by dissolving approximately 0.025 mole of the appropriate bis-basic fluorene ketone in 200 ml of pyridine to which a solution of 2.0 ml of 40% benzyltrimethylammonium hydroxide in pyridine has been added. The mixture is stirred at room temperature while oxygen is bubbled through the solution at a rate of 500 ml/minute for a total of 4 hours. The reaction mixture is evaporated to dryness leaving a residue which is chromatographed on an alumina column using chloroform as the eluant. The eluant solvent is removed by evaporation and the desired compound recrystallized from a chloroform/petroleum ether or chloroform/acetone mixture. In accordance with this procedure, the following bis-basic fluorene ketones: 2,-7-bis[4-(piperidino)butyryl]fluorene, 2,7-bis[5-(morpholino)butyryl]fluorene, 2,7-bis[5-(diethylamino)-valeryl]fluorene, and 2,7-bis[5-(dimethylamino)-valeryl]fluorene are used to prepare the following bis-basic fluoren-9-ones, respectively: 2,7-bis[4-(piperidino)butyryl]fluoren-9-one, having a m.p. of 168°–70°C.; 2,7-bis[5-(morpholino)butyryl]fluoren-9-one, having a m.p. of 145.5°–7.5°C.; 2,7-bis[5-(diethylamino)valeryl]fluoren-9-one, having a m.p. of 108°–9.5°C.; and 2,7-bis[5-(dimethylamino)valeryl]-fluoren-9-one, having a m.p. of 149.5°–151.0°C.

EXAMPLE 5

2,7-Bis[4-(piperidino)butyryl]fluorene N,N-dioxide

A mixture of 13 g of 2,7-bis[4-(piperidino)butyryl]fluorene, 10.5 g of an 85% solution of m-chloroperbenzoic acid and 450 ml of chloroform are stirred at room temperature for approximately 1 hour. After completion of the reaction, the solvent is removed in vacuo from the reaction mixture. The residue is dissolved in approximately 200 ml of methanol and percolated through a 7 × 10 cm anion exchange chromatographic column (Dowex 2–OH − form). The column is washed with methanol until a combined effluent of 600 ml is obtained. The solvent is removed in vacuo and the residue crystallized from a chloroform/acetone solution. The crude material is dissolved in chloroform, percolated through a florisil column, eluted with approximately 200 ml of chloroform, the combined eluate concentrated to dryness, and the residue crystallized from a chloroform/acetone solution to yield 2,7-bis[4-(piperidino)butyryl]fluorene N,N-dioxide as the hemihydrate which decomposes on heating at temperatures above 180°C.

Following essentially this same procedure but substituting 2,7-bis[5-(morpholino)butyryl]fluorene, 2,7-bis[5-(diethylamino)valeryl]fluorene, 2,7-bis[5-(dimethylamino)valeryl]fluorene, 2,7-bis[4-(piperidino)-butyryl]fluoren-9-one, 2,7-bis[5-(morpholino)-butyryl]fluoren-9-one, 2,7-bis[5-(diethylamino)-valeryl]fluoren-9-one, and 2,7-bis[5-(dimethylamino)-valeryl]fluorene-9-one for the 2,7-bis-[4-(piperidino)butyryl]fluorene above results in the formation of 2,7-bis[5-(morpholino)butyryl]fluorene N,N-dioxide, 2,7-bis[5-(diethylamino)valeryl]fluorene N,N-dioxide, 2,7-bis[5-(dimethylamino)valeryl]fluorene N,N-dioxide, 2,7-bis[4-(piperidino)butyryl]fluoren-9-one N,N-dioxide, 2,7-bis[5-(morpholino)-butyryl]fluoren-9-one N,N-dioxide, 2,7-bis[5-(diethylamino)valeryl]fluoren-9-one N,N-dioxide and 2,7-bis[5-(dimethylamino)valeryl]fluoren-9-one N,N-dioxide, respectively.

EXAMPLE 6

2,7-Bis[5-(dimethylamino)valeryl]xanthene

A mixture of 20 g (0.048 mole) of 2,7-bis(5-chlorovaleryl)xanthene, 2 g of potassium iodide, 200 ml of 40% aqueous dimethylamine and 100 ml of tetrahydrofuran are heated and stirred at 100°C. for 72 hours. On cooling excess dimethylamine and tetrahydrofuran are evaporated. The precipitate which forms on standing is recrystallized twice from heptane to yield 2,7-bis[5-(dimethylamino)valeryl]xanthene having a m.p. of 126.5°–8.5°C.

Following essentially the same procedure but substituting piperidine for the aqueous dimethylamine above results in the formation of 2,7-bis[5-(piperidino)valeryl]xanthene having a m.p. of 129°–30°C.

Similarly, substituting 2,7-bis(3-chloropropionyl)xanthene for the 2,7-bis(5-chlorovaleryl)xanthene and diethylamine for the 40% aqueous dimethylamine above results in the formation of 2,7-bis[3-(diethylamino)propionyl]xanthene which when treated with ethereal hydrochloric acid and recrystallized from a mixture of methanol/ether forms the dihydrochloride hydrate having a m.p. of 184.5°–5.5°C.

Substituting 2,7-bis(4-chlorobutyryl)xanthene and piperidine for the 2,7-bis(5-chlorovaleryl)xanthene and aqueous dimethylamine above, results in the formation of 2,7-bis[4-(piperidino)butyryl]xanthene which when crystallized from acetone has a m.p. of 115°–7°C.

EXAMPLE 7

2,7-Bis[4-(piperidino)butyryl]xanthen-9-one

To a solution of 9.8 g (0.025 mole) of 2,7-bis[4-(piperidino)butyryl]xanthene in 300 ml of glacial acetic acid is added 9.8 g (0.033 mole) of sodium dichromate over a 30 minute period. The mixture is stirred for 1½ hours, refluxed for one hour, evaporated to dryness, diluted with water and made alkaline with an aqueous NH₄OH solution. The solid which forms is extracted with methylene chloride and chromatographed on an alumina column using methylene chloride as the eluting agent. The combined eluant is evaporated and the residue recrystallized from heptane to yield 2,7-bis[4-(piperidino)butyryl]xanthen-9-one having a m.p. of 93°–5°C.

EXAMPLE 8

2,7-Bis[5-(dimethylamino)valeryl]xanthene N,N-dioxide

A mixture of 2,7-bis[5-(dimethylamino)valeryl]xanthene, an 85% m-chloroperbenzoic acid solution and 450 ml of chloroform are stirred at room temperature for 90 minutes. The volatile solvents are removed in vacuo and the residue dissolved in methanol. The resulting solution is percolated through a 7 × 10 cm anion exchange chromatographic column (Dowex 2–OH — form) and the column is eluted with fresh methanol until the eluate appears colorless. The combined eluates are evaporated to dryness and recrystallized from a chloroform/acetone solution yielding 2,7-bis[5-(dimethylamino)valeryl]xanthene N,N-dioxide.

Following essentially the same procedure but substituting 2,7-bis[5-(piperidino)valeryl]xanthene, 2,7-bis[3-(diethylamino)propionyl]xanthene, 2,7-bis[4-(piperidino)butyryl]xanthene and 2,7-bis[4-(piperidino)butyryl]xanthen9-one for the 2,7-bis[5-(dimethylammino)valeryl]xanthene above results in the formation of 2,7-bis[5-(piperidino)valeryl]xanthene N,N-dioxide, 2,7-bis[3-(diethylamino)propionyl]xanthene N,N-dioxide, 2,7-bis[4-(piperidino)butyryl]xanthene N,N-dioxide, and 2,7-bis[4-(piperidino)butyryl]xanthen-9-one N,N-dioxide, respectively.

EXAMPLE 9

Illustration of the Antiviral Activity of 2,7-bis[4-(piperidino)butyryl]fluorene N,N-dioxide Thirty mice weighing approximately 20 grams each are divided into two groups, a control group of 20 animals and a test group of 10 animals. All of the animals are challenged with a fatal dose (22 $LD_{50}$) of Semliki Forest virus. The test group of animals are subcutaneously administered a prophylactic composition containing 2,7-bis[4-(piperidino)butyryl]fluorene N,N-dioxide hemihydrate as the active ingredient which is dissolved in a vehicle solution of 0.15% aqueous hydroxyethylcellulose. The composition contains the active ingredient in amounts such that each dosage contains 0.25 ml of the active ingredient at levels of 6.25; 12.5; 25; 50; 100 and 200 mg/kg. The control group receives a subcutaneous placebo containing the same volume of vehicle without the active ingredient. Observations made over a ten day period show the termination of all of the control animals within a period of from 6 to 8 days. The groups of animals treated at the dosages indicated showed the following survival rates: 0, 20, 40, 20, 70 and 50%. Based on this data an effective dose, or $ED_{50}$, of 57 mg/kg can be calculated, which is the effective dose when given subcutaneously to mice that will protect 50% of all of the animals challenged with a highly lethal dose (22 $LD_{50}$) of Semliki Forest virus.

EXAMPLE 10

An illustrative preparation of 10,000 tablets, each containing 100 mg of 2,7-bis[4-(piperidino)butyryl]fluorene N,N-dioxide as the hemihydrate is prepared as follows:

| | Gm |
|---|---|
| 2,7-bis[4-(piperidino)butyryl]fluorene N,N-dioxide hemihydrate | 1000 |
| Lactose | 1000 |
| Starch paste (10% w/v starch in water) | 100 |
| Starch | 32.5 |
| Calcium stearate | 6.5 |

The active ingredient is uniformly mixed with the lactose and granulated by the addition of the starch paste. The granules which form are dried at 120°F. for 20 hours and forced through a No. 16 screen. The granules are lubricated by the addition of the starch and calcium stearate and compressed into tablets. Each tablet so prepared contains 100 mg of the active ingredient.

EXAMPLE 11

An illustrative composition for the preparation of 1000 two-piece hard gelatin capsules, each capsule containing 100 mg of 3,9-bis[4-(piperidino)butyryl]fluoranthene N,N-dioxide hydrated with 3.5 moles of water is prepared as follows:

| | Gm |
|---|---|
| 3,9-bis[4-(piperidino)butyryl]fluoranthene N,N-dioxide . 3.5 $H_2O$ | 100 |
| Corn starch | 150 |
| Magnesium stearate | 25 |
| 1000 hard gelatin capsules | |

The finely powdered ingredients are mixed until uniformly dispersed and then filled into hard shelled gelatin capsules of the appropriate size.

In a similar fashion, soft gelatin capsules may be prepared in which the above composition can be granulated, slugged or directly compressed in a rotary die or plate mold in which the soft gelatin capsule is formed. Alternatively, the above excipients may be omitted and the active ingredient dispensed as a powder directly into the soft gelatin capsule.

EXAMPLE 12

A 2% weight per volume syrup of 2,7-bis[4-(piperidino)butyryl]fluorene N,N-dioxide hemihydrate is prepared by the usual pharmaceutical techniques in accordance with the following formula:

| | Gm |
|---|---|
| Finely divided 2,7-bis[4-(piperidino)butyryl]fluorene N,N-dioxide hemihydrate | 2.0 |
| Sucrose | 33.3 |
| Chloroform | 0.25 |
| Sodium benzoate | 0.4 |
| Methyl p-hydroxybenzoate | 0.02 |
| Vanillin | 0.04 |
| Glycerol | 1.5 |
| Purified water to 100.0 ml | |

EXAMPLE 13

One thousand grams of an ointment for topical application containing 1.0% of 2,7-bis[4-(piperidino)butyryl]fluoren-9-one N,N-dioxide dihydrate is prepared from the following ingredients:

| | Gm |
|---|---|
| 2,7-bis[4-(piperidino)butyryl]fluoren-9-one N,N-dioxide dihydrate | 10 |
| Light liquid petrolatum | 250 |
| Wool fat | 200 |
| White petrolatum q.s. ad | 1000 |

The wool fat, white petrolatum and 200 gms of the light liquid petrolatum are liquified and held at 110°F. The active ingredient is mixed with the remaining liquid petrolatum and passed through a colloid mill. After passing through the mill, the mixture is stirred into the melt, and the melt is permitted to cool with continued stirring until congealed.

EXAMPLE 14

An illustrative composition for an emulsion which is parenterally injectable is as follows:

| Each ml Contains | Ingredients | Amount |
|---|---|---|
| 50 mg | 2,7-bis[4-(diethylamino)-butyryl]xanthene N,N-dioxide | 1.000 g |
| 100 mg | Polyoxyethylene sorbitan monooleate | 2.000 g |
| 0.0064 gm | Sodium chloride | 0.128 g |
| | Water for injection, q.s. ad | 20.000 ml |

The parenteral composition is prepared by dissolving 0.64 g of sodium chloride in 100 ml of water suitable for injection. The polyoxyethylene sorbitan monooleate is mixed with the active ingredient, and an amount of the previously prepared aqueous sodium chloride solution added which is sufficient to bring the total volume to 20 ml.

The resulting solution is shaken and autoclaved for 20 minutes at 110°C. at 15 p.s.i.g. steam pressure. The composition can be dispensed in single ampule for use in multiple dosages or it can be dispensed as 10 or 20 individual ampules for use as a single dosage unit.

We claim:

1. An essentially pure N,N-dioxide of a bis-basic cyclic ketone having the formula

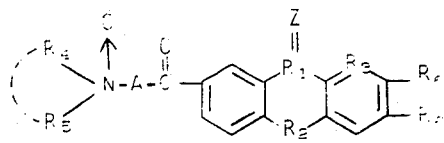

wherein
Z is oxygen or $H_2$;
$R_1$ is carbon;
$R_2$ is a sigma bond or oxygen;
$R_3$ is methylidyne;
A is a straight or branched alkylene chain having from 2 to 4 carbon atoms;
$R_4$ and $R_5$ are each selected from the group consisting of lower alkyl having from 1 to 3 carbon atoms and when taken together with the nitrogen atom to which they are attached represent the pyrrolidinyl, piperidino and morpholino group;
$R_6$ is selected from the group consisting of hydrogen and

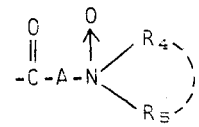

with the proviso that one and only one such $R_6$ group is hydrogen;
$R_1$, Z and $R_3$ taken together form the group

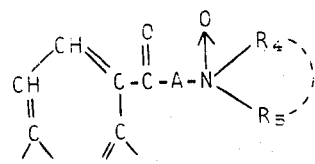

when each $R_6$ is hydrogen and $R_2$ is a sigma bond; and the pharmaceutically acceptable acid addition salts thereof.

2. A compound according to claim 1 in which A is trimethylene.
3. A compound according to claim 1 in which $R_2$ is a sigma bond.
4. A compound according to claim 1 in which $R_4$ and $R_5$ are each lower alkyl having from 1 to 3 carbon atoms.
5. A compound according to claim 1 which is 2,7-bis-[(4-piperidino)butyryl]fluorene N,N-dioxide.
6. A compound according to claim 1 which is 2,7-bis-[(4-piperidino)butyryl]fluoren-9-one N,N-dioxide.
7. A compound according to claim 1 which is 3,9-bis-[(4-piperidino)butyryl]fluoranthene N,N-dioxide.

* * * * *